United States Patent [19]

Igarashi et al.

[11] 4,386,406
[45] May 31, 1983

[54] FUEL LEVEL MEASURING METHOD AND APPARATUS OF THE SAME

[75] Inventors: Osamu Igarashi; Tomoji Inui, both of Katsuta, Japan

[73] Assignee: Hitachi, Ltd., Tokyo, Japan

[21] Appl. No.: 171,267

[22] Filed: Jul. 22, 1980

[30] Foreign Application Priority Data

Aug. 1, 1979 [JP] Japan .................................. 54-97341

[51] Int. Cl.³ ............................................. G01F 23/10
[52] U.S. Cl. .................................... 364/442; 364/573; 73/1 H; 73/113; 73/313
[58] Field of Search ............... 364/442, 424, 571, 573, 364/575; 235/92 FL; 73/113, 114, 313, 304 R, 308, 1 H

[56] References Cited

U.S. PATENT DOCUMENTS

| | | |
|---|---|---|
| 3,908,451 | 9/1975 | Walker et al. ........................ 73/114 |
| 3,967,097 | 6/1976 | Moretti ................................ 364/442 |
| 4,064,396 | 12/1977 | Panarello ............................ 364/573 |
| 4,102,191 | 7/1978 | Harris .................................... 73/313 |
| 4,178,802 | 12/1979 | Yamamoto ........................... 73/313 |
| 4,212,195 | 7/1980 | Young ................................. 364/442 |
| 4,218,744 | 8/1980 | Pratt et al. ........................... 364/442 |
| 4,250,750 | 2/1981 | Martinec et al. ...................... 73/308 |
| 4,282,578 | 8/1981 | Payne et al. ......................... 364/573 |

Primary Examiner—Gary Chin
Attorney, Agent, or Firm—Antonelli, Terry & Wands

[57] ABSTRACT

A fuel level measuring apparatus for obtaining data on the amount of residual fuel in a tank. The apparatus utilizes a sensor for detecting the fuel level in a fuel tank and a microcomputer storing data giving a relationship between an output of the sensor and the amount of residual fuel in the fuel tank.

7 Claims, 9 Drawing Figures

FUEL LEVEL MEASURING METHOD AND APPARATUS OF THE SAME

BACKGROUND OF THE INVENTION

The present invention relates to a fuel level measuring method for use in an automobile and, more particularly, to a fuel level measuring method which may be implemented with a microcomputer.

As disclosed in U.S. Pat. No. 3,842,673 to John W. Riddel, in a conventional fuel level meter for an automobile, the fuel level in a fuel tank is converted into an output signal by means of a sensor having winding type resistor with a sliding contact. With a predetermined resistance value of the sliding resistor, a current coming from a constant voltage source is controlled to cause a pointer to point to the fuel level measured. Practically, the shape of the fuel tank is not uniform and the fuel level and the moving angle of the sensor are not always in a linear proportional relation to each other. Therefore, some adjustment must be made to the moving angle and the output resistance of the winding resistor, so as to set up a linear relation between the fuel level and the fuel level value indicated by the pointer.

The total of the errors accumulated through the signal process ranging from the sensor to the pointer is great. For this reason, in actual practice, the indication of the fuel level by the pointer is a mere approximation of the actual fuel level. On the other hand, a driver requires information concerning the fuel level in the fuel tank with the best possible accuracy, since he uses such information more frequently, as compared with other information for driving the automobile.

SUMMARY OF THE INVENTION

Accordingly, an object of the present invention is to provide a fuel level measuring method which provides an indication of fuel level with a high accuracy, eliminating the above-mentioned disadvantages.

In brief, the fuel level measuring method of the present invention previously stores data of the sensor outputs and the fuel level in a fuel tank in a memory of the computer, and computes an accurate fuel level from a mean value of the outputs from the sensor within a given period of time.

DETAILED DESCRIPTION OF THE PREFERRED EMBODIMENTS

Figure 1:
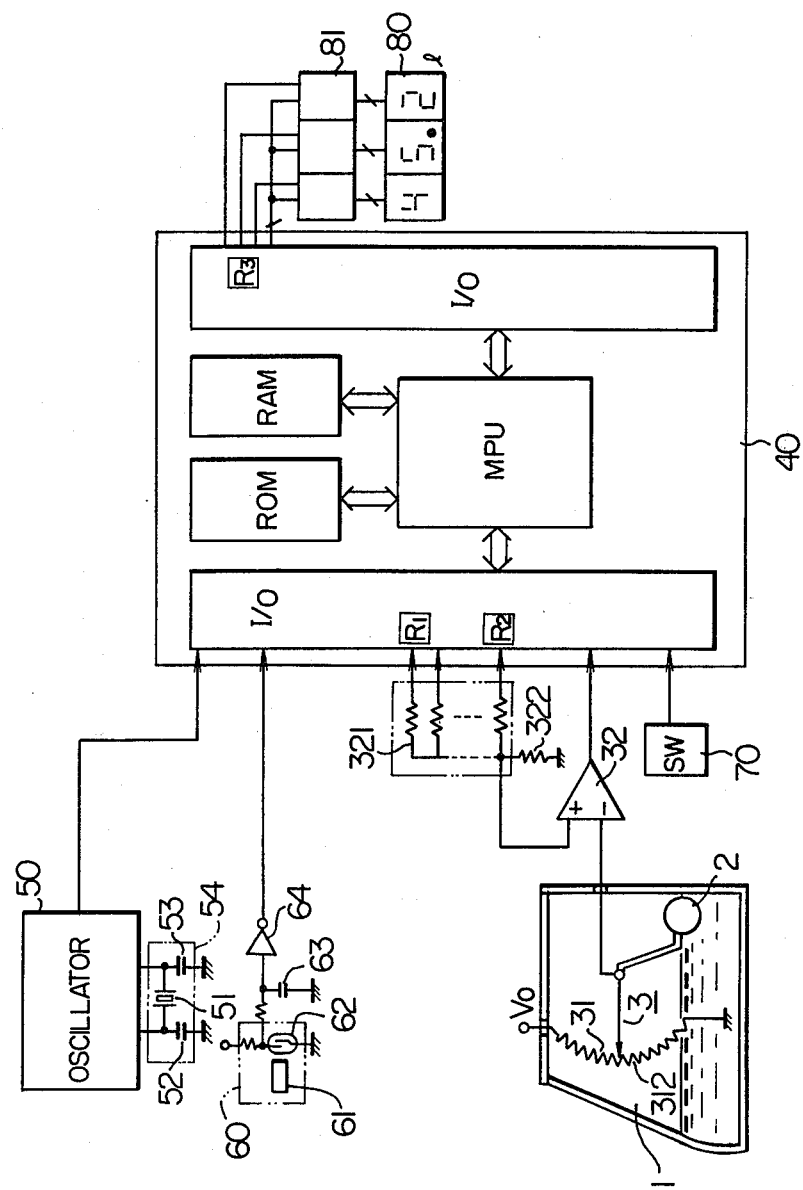
FIG. 1 is a block diagram of a system for a fuel level measuring method according to an embodiment of the present invention.

In FIG. 1, reference numeral 1 designates a fuel tank; 2 a float; 3 a fuel level sensor. The fuel level sensor 3 has a sliding contact 31 interlocking with the float 2. An output signal from a middle point of the resistor 312 is coupled by way of the contact 31 to one of the input terminals of a voltage comparator 32. The fixed resistor member 312 is constructed as a thick film resistance element. A common connection point of a plurality of resistors 321 to 322 is connected to the other input of the voltage comparator 32. The output terminal of the comparator 32 is coupled with an input/output (I/O) circuit of a microcomputer 40. The microcomputer 40 includes a microprocessor (MPU) for performing an arithmetic operation and its related control, a read only memory (ROM) for storing a program, and a random access memory (RAM) for setting up or arranging data. Output registers R1 and R2 of the input/output port (I/O) are coupled at respective bit positions thereof with resistors 321 of which the values are weighted by a binary code. The other ends of the resistors 321 are commonly grounded by way of resistor 322. The voltage comparator 32, the microcomputer 40, and the resistors 321 and 322 cooperate to form an analog to digital converter. An oscillator 50 is comprised of a piezoelectric resonator 51, capacitors 52 and 53, and a circuit section 54. A speed sensor 60 is comprised of a magnet 61 rotating in accordance with vehicle speed, and a lead switch 62. Reference numeral 63 designates a capacitor and 64 designates an inverter. An external switch 70 is used for selecting a desired item or items to be displayed on a display unit 80.

Figure 2:
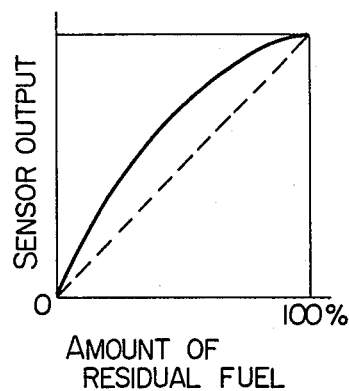
FIG. 2 is a graphical representation of an output characteristic of a gauge used in the system shown in FIG. 1.

An output register R3 of the microcomputer 40 is used for driving the display unit 80. The output thereof is applied to a BCD (binary coded decimal) input of a decoder driver 81 in the form of a latch. The display unit 80 is designed to display three digits, capable of displaying down to the first decimal place. The output signal of the fuel level sensor 3 nonlinearly varies with the level of the residual fuel, as shown in FIG. 2. By means of the nonlinearity, a change in low fuel levels is preferably plotted with a detailed scale in order to improve the resolution in reading the fuel level.

Figure 3:
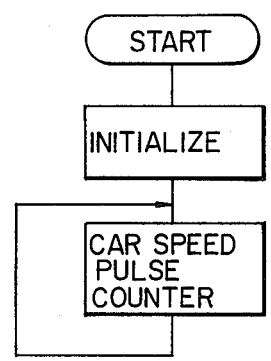
FIG. 3 is a main routine of a microcomputer used in the system in FIG. 1.
Figure 4:
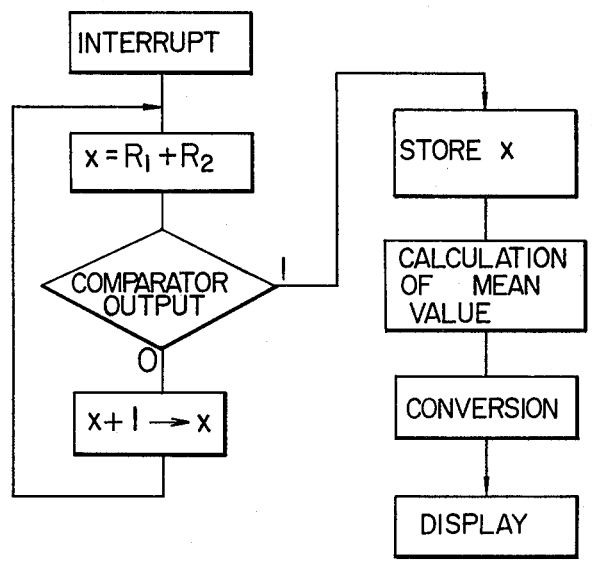
FIG. 4 is a flow chart for processing an interrupt.

The general flow charts of the microcomputer are as shown in FIGS. 3 and 4. FIG. 3, illustrating a main routine, counts output pulses from a car speed sensor 60. During the course of executing the main routine, a timer interrupt is issued at fixed time intervals. Upon generation of the interrupt, "0" is applied to the output register R1 of the analog to digital converter, as shown in FIG. 4. Then, it is judged whether the output signal from the voltage comparator 32 is "0" or "1". If it is "0", "1" is added to the contents of the output registers R1+R2. Again, the comparison is performed. Through repetition of the above-mentioned operations, when the output signal of the voltage comparator becomes "1", that is, when the output of the sensor 3 is equal in level to the terminal output of the resistors 321, the contents of the output register are stored in the memory. In response to the next interrupt, the data resulting from the same operation as the above is compared with the data stored previously. The larger of the two data items is stored in a memory location provided exclusively for it. The smaller one is stored in another memory location provided exclusively for it. In this way, the data obtained through generation of the interrupts is stored and a mean value of that data is calculated.

Figure 5:
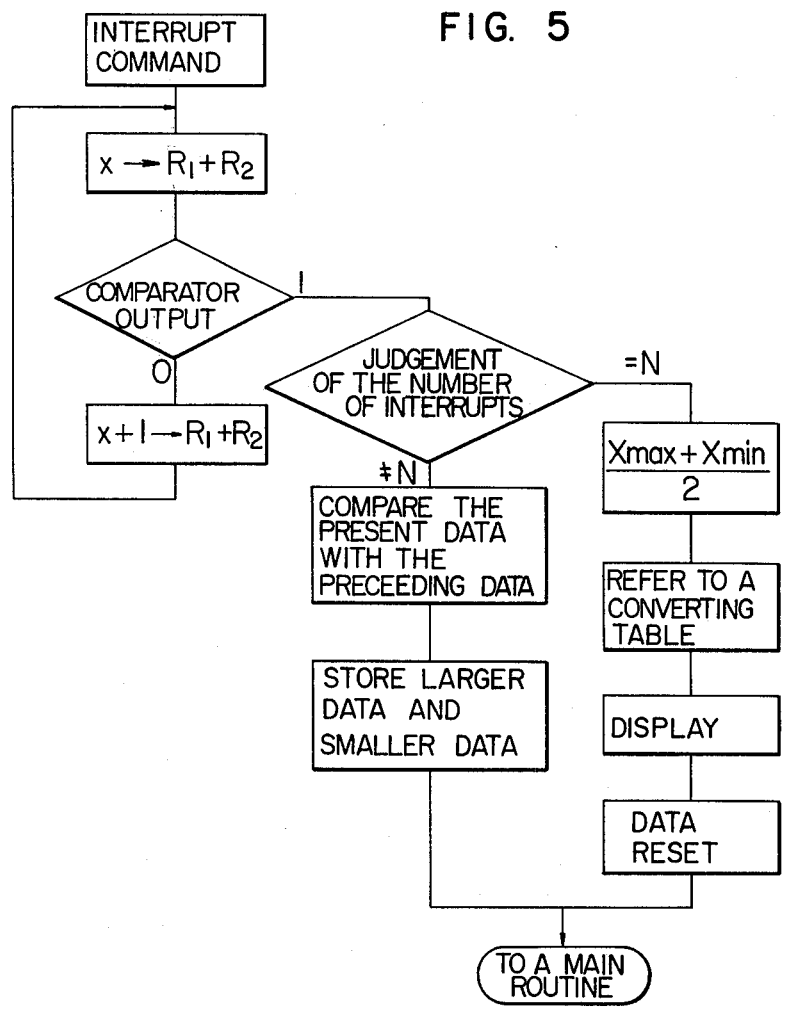
FIG. 5 is a flow chart for computing a mean value in the flow chart shown in FIG. 4.
Figure 6:
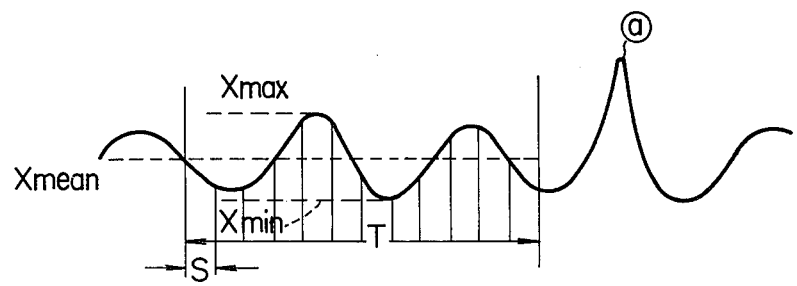
FIG. 6 is a graphical representation for illustrating a timing relation between a fuel level and the interrupt.

The position on a scale indicated by the sensor (fuel gauge) exactly corresponds to the value displayed by the display, in the state where the car is at a standstill. When the car is running, the liquid surface constantly undulates due to the inequality of the load surface, or deceleration or acceleration of the car. Therefore, unless some countermeasure is taken for the undulation of the fuel level, the displayed value always fluctuates, so that a driver finds it difficult to read the scale of the fuel level. This is the reason why the mean value of those varying indications is necessary. Because of the liquid nature of the fuel, its level changes substantially sinusoidally with time, as shown in FIG. 6. Accordingly, a flow chart as shown in FIG. 5 is preferably used for the mean value calculation in the flow chart shown in FIG. 4. A program flow for obtaining a position on the scale of the sensor, i.e. the A/D conversion, is repetitively performed with relatively short time intervals S, e.g. 5 msec. In this case, the present converted value is compared with the preceeding one for each converting operation and the larger value and the smaller value are stored separately. For a period from a fixed time point to a time point at which the number of interrupts reaches a given value, that is, for a fixed time period T (1 to 2 minutes, for example), a mean value $X_{mean}$ is calculated from the stored maximum values $X_{max}$ and minimum values $X_{min}$, and this mean value calculated is converted into a value which is used for display of the fuel level as a corrected value.

Figure 7:
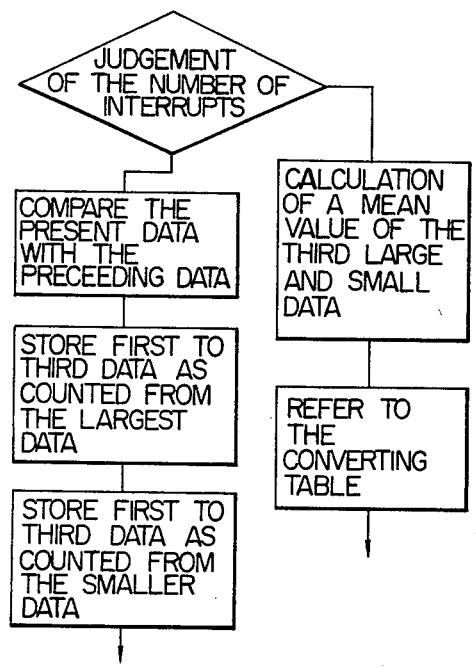
FIG. 7 is a flow chart illustrating another computation of the mean value.

The use of the mean value is still insufficient for obtaining the real correct one. Generally, the liquid level undulates substantially sinusoidally with time, but sometimes changes which are extremely high or low occur, as indicated by a in FIG. 6. Those abnormally high and low level changes of the fuel must be regarded as noise and therefore neglected. In this respect, the mean of the values representing the second or third magnitudes rather than the maximum and the minimum values, provides a more correct fuel level. A major part of the program flow to realize this approach is illustrated in FIG. 7.

Another approach to secure the correct fuel level is that a difference between a value X0 currently being displayed and a value X1 to be displayed is calculated and when the difference exceeds a given value, the contents of the display is left unchanged. Assume that a normal running of a car never experiences a situation that the X1 changes relative to the X0, exceeding by 5% or more during the period T, for example. On this assumption, the approach designs the apparatus so as not to display such data of the relative change of 5% or more. The judgement of such, if there is a relative change of 5% of more, is made, following the mean value calculation in the flow chart shown in FIG. 5.

Figure 8:
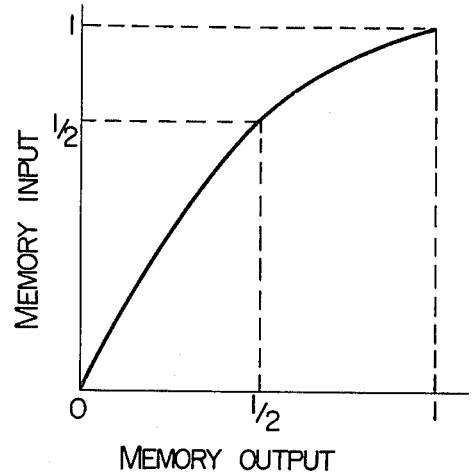
FIG. 8 is a graph for illustrating an input/output characteristic of a converting ROM for converting digital data into another value.

The data thus obtained is proportional to the output signal from the sensor 3. Therefore, it is nonlinear with respect to the level of the fuel. Therefore, the data obtained must be converted into a value which is linearly proportional to the actual amount of the residual fuel. To this end, a converting table is prepared by using a read only memory (ROM) within the computer. The data obtained is converted, in accordance with the contents of the converting table, into an appropriate value which in turn is applied to the display unit. The input/output characteristic of the converting table is as illustrated in FIG. 8 and, as shown, the scales in the low input region are divided into smaller sections.

As described above, a thick film resistor is used for the fixed resistor 312 in the sensor of the fuel level measuring apparatus. As a result, an output signal accurately representing the fuel level measured may be obtained, regardless of a shape of the tank. For example, a resolution in reading values of the low fuel levels may be improved in a manner that in a region where the fuel level is low, a rate of change of the resistance with respect to a level change is set to be large. Additionally, since the use of a function trimming method is allowed, the accuracy is further improved.

Moreover, any suitable converting table may be prepared into the ROM of the microcomputer. This indicates that a single system for measuring a fuel level is applicable for a great variety of cars. Accordingly, this apparatus is very economical.

Additionally, the apparatus has a good accuracy in low fuel levels about which a driver is most worried. This ensures relaxed driving of the car.

The present invention has another useful effect. Since the automobile necessarily sways when running, the liquid level of the fuel tank always undulates. Because of the liquid nature of the fuel, however, fuel level regularly undulates with substantially equal upper and lower magnitudes, with respect to a liquid level in a standstill state. Therefore, the correct data of the present residual fuel amount may be obtained by calculating a mean of the maximum and minimum values of the liquid level for a given period of time.

The data of the residual fuel thus obtained is displayed by the display unit 80, and may also be used for calculating a specific fuel consumption performed within the computer. In the later case, the result of the calculation may be displayed to the driver.

Figure 9:
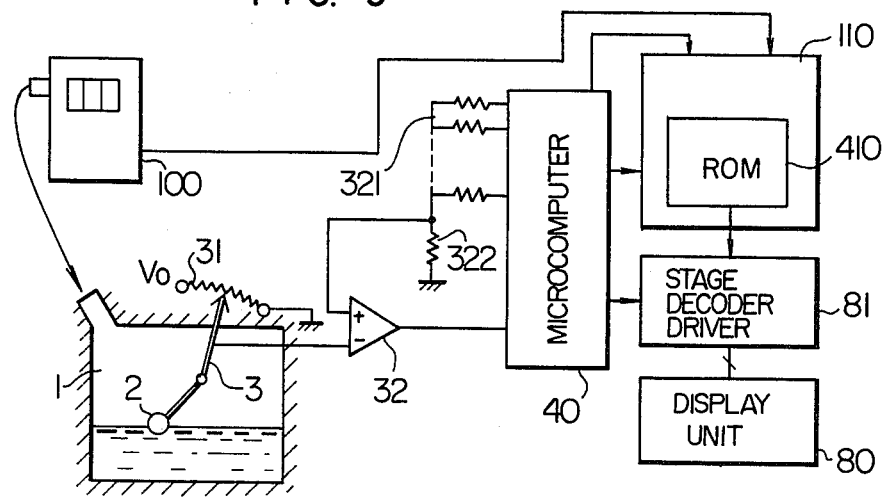
FIG. 9 is a block diagram of another embodiment of the fuel level measuring apparatus according to the present invention.

In another embodiment of the present invention, the converting table may be prepared without using the ROM in the computer. As illustrated in FIG. 9, the control of the microcomputer is applied only to the analog-to-digital converter. A ROM 410 may be used as means for converting the output of the converter.

More specifically, in an automobile mounting a fuel level measuring apparatus of the invention, an accurate amount of fuel is supplied to a fuel tank, through a high precision fuel flow meter 100. The address of an EPROM 410 is designated by the microcomputer 40. With respect to the input data into the address designated, the flow of the fuel metered by the flow meter 100 is written by a writing device 110. Once so done, a relation between a fuel level and its display value is unconditionally determined, regardless of the shape of the tank and the accuracy of the sensor. Of course, this method is effective only when the car is at a standstill. When the car is running, the above-mentioned method must be employed for forming display data. If an electrically writable non volatile ROM, or EPROM or EAROM, is used for the ROM 410, the write operation with a relatively high accuracy for each car is ensured.

As described above, the present invention may provide a fuel level measuring method and apparatus for this purpose. Thus, the present invention has a great useful effect from the viewpoint of technology, economy and reliability.

We claim:

1. A method for measuring the residual fuel in a tank by detecting the fuel level in the tank and converting the detected fuel level into a value representing the residual fuel in the tank, comprising the steps of:
producing successive output signals corresponding to detected values of fuel level within a fuel tank over a predetermined period of time;
dividing said output signals into large values and small values during said predetermined period of time;
obtaining a mean value between output signals of a given order of magnitude amongst the output signals of large value and small value received during said predetermined period of time;
storing a characteristic representing the relationship between the value of said output signals and the quantity of residual fuel in said tank; and
converting said mean value to a value representing residual fuel quantity on the basis of said stored characteristic.

2. A method according to claim 1, wherein said mean value is obtained on the basis of the third order of magnitude of the large value and small value signals received during a predetermined period of time.

3. A method according to claim 1, wherein said mean value is obtained from at least one large value other than the maximum of said large values and from at least one small value other than the minimum of said small values received during a predetermined period of time.

4. A residual fuel measuring apparatus comprising
sensor means for sensing the fuel level of a fuel tank and for producing an output signal whose magnitude varies in a non-linear relationship with changes in the fuel level in said fuel tank;
converting means for converting the output signal from said sensor means into a signal representing the amount of residual fuel in said tank including means for storing characteristic values representing the relationship between the non-linear output of said sensor means and the amount of residual fuel in said tank; and
means for producing an indication of residual fuel on the basis of successive outputs from said sensor means during a predetermined period of time, including means for dividing the output signals from said sensor means into large values and small values during said predetermined period of time and obtaining a mean value between output signals of a given order of magnitude amongst the output signals of large value and small value received during said predetermined time period, and means for applying said mean value to said converting means.

5. A residual fuel measuring apparatus as defined in claim 4, wherein said sensor means includes a potentiometer in the form of a thick layer resistance element having a large changing rate of resistance for changes in fuel level in a range of low fuel level.

6. A residual fuel measuring apparatus according to claim 4, wherein said converting means includes a microcomputer and a data converting memory is included in a program memory ROM of said microcomputer.

7. A residual fuel measuring apparatus according to claim 4, wherein said converting means includes a data converting memory and a program memory of a microcomputer.

* * * * *